United States Patent
Venkatachari et al.

(10) Patent No.: US 9,185,650 B2
(45) Date of Patent: Nov. 10, 2015

(54) APPARATUS AND METHOD FOR CONTROLLING DOWNLINK POWER IN EARLY DECODE TERMINATION MODE

(71) Applicant: QUALCOMM Incorporated, San Diego, CA (US)

(72) Inventors: Harish Venkatachari, Sunnyvale, CA (US); Nate Chizgi, Sunnyvale, CA (US); Prashant Udupa Sripathi, San Diego, CA (US); Atul Arvind Salvekar, Emeryville, CA (US); Sharif Ahsanul Matin, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 117 days.

(21) Appl. No.: 14/028,267

(22) Filed: Sep. 16, 2013

(65) Prior Publication Data
US 2014/0078951 A1  Mar. 20, 2014

Related U.S. Application Data

(60) Provisional application No. 61/702,087, filed on Sep. 17, 2012.

(51) Int. Cl.
| | |
|---|---|
| *H04W 52/02* | (2009.01) |
| *H04W 52/38* | (2009.01) |
| *H04W 52/14* | (2009.01) |
| *H04W 52/24* | (2009.01) |
| *H04W 52/28* | (2009.01) |

(52) U.S. Cl.
CPC ...... *H04W 52/0225* (2013.01); *H04W 52/0245* (2013.01); *H04W 52/241* (2013.01); *H04W 52/287* (2013.01); *H04W 52/143* (2013.01); *H04W 52/38* (2013.01); *Y02B 60/50* (2013.01)

(58) Field of Classification Search
None
See application file for complete search history.

(56) References Cited

U.S. PATENT DOCUMENTS

2003/0072276 A1 * 4/2003 DiFazio et al. .............. 370/318
2008/0057995 A1 * 3/2008 Komulainen et al. ........ 455/522

FOREIGN PATENT DOCUMENTS

| EP | 1677433 A1 | 7/2006 |
|---|---|---|
| WO | WO-2008025885 A1 | 3/2008 |

OTHER PUBLICATIONS

International Search Report and Written Opinion—PCT/US2013/060115—ISA/EPO—Nov. 13, 2013.

(Continued)

*Primary Examiner* — Faruk Hamza
*Assistant Examiner* — Cassandra Decker
(74) *Attorney, Agent, or Firm* — Arent Fox LLP (57) ABSTRACT

Disclosed are systems and methods for controlling by the User Equipment (UE) downlink power in early decode termination mode. In one aspect, the UE may be configured to perform early decoding of a downlink (DL) transmission from a base station. The UE further configured to estimate a signal-to-interference ratio (SIRE) of the DL transmission. Based on the SIRE, the UE is configured to select a Transmission Power Control (TPC) command sequence for a low power mode of operation of the UE in which a receiver is powered down. The UE is further configured to activate the low power mode and transmit the selected TPC command sequence to the base station to adjust a DL transmission power during the low power mode.

32 Claims, 7 Drawing Sheets

(56) References Cited

OTHER PUBLICATIONS

QUALCOMM Incorporated: "Introducing Enhancements to CS voice over DCH," 3GPP Draft; R1-123809 (3GPP),Mobile Competence Centre ; 650, Route Des Lucioles ; F-06921 Sophia-Antipolis Cedex ; FR, vol. RAN WG1, No.Qingdao, China; Aug. 13-17, 2012 Aug. 5, 2012. XP050661662.

\* cited by examiner

APPARATUS AND METHOD FOR CONTROLLING DOWNLINK POWER IN EARLY DECODE TERMINATION MODE

CLAIM OF PRIORITY UNDER 35 U.S.C. §119

The present application for patent claims priority to Provisional Application No. 61/702,087 filed on Sep. 17, 2012, and assigned to the assignee hereof and hereby expressly incorporated by reference herein.

BACKGROUND

1. Field

Aspects of the present disclosure relate generally to wireless communication systems, and more particularly, to an apparatus and method for controlling downlink power in early decode termination mode.

2. Background

Wireless communication networks are widely deployed to provide various communication services such as telephony, video, data, messaging, broadcasts, and so on. Such networks, which are usually multiple access networks, support communications for multiple users by sharing the available network resources. One example of such a network is the UMTS Terrestrial Radio Access Network (UTRAN). The UTRAN is the radio access network (RAN) defined as a part of the Universal Mobile Telecommunications System (UMTS), a third generation (3G) mobile phone technology supported by the 3rd Generation Partnership Project (3GPP). The UMTS, which is the successor to Global System for Mobile Communications (GSM) technologies, currently supports various air interface standards, such as Wideband-Code Division Multiple Access (WCDMA), Time Division-Code Division Multiple Access (TD-CDMA), and Time Division-Synchronous Code Division Multiple Access (TD-SCDMA). The UMTS also supports enhanced 3G data communications protocols, such as High Speed Packet Access (HSPA), which provides higher data transfer speeds and capacity to associated UMTS networks. High Speed Downlink Packet Access (HSDPA) is a data service offered on the downlink of WCDMA networks.

Some WCDMA systems provide early voice frame termination functionality by which early decoding on voice and data transport channels is attempted by the UE receiver, so that the receiver may be transitioned into a low-power state to preserve batter power if the early decoding of the frame is deemed successful.

SUMMARY

The following presents a simplified summary of one or more aspects of mechanisms for controlling downlink power in early decode termination mode. This summary is not an extensive overview of all contemplated aspects of the invention, and is intended to neither identify key or critical elements of the invention nor delineate the scope of any or all aspects thereof. Its sole purpose is to present some concepts of one or more aspects in a simplified form as a prelude to the more detailed description that is presented later.

In general, the systems and methods disclosed herein facilitate controlling downlink power in early decode termination mode. In one aspect, the UE may be configured to perform early decoding of a downlink (DL) transmission from a base station. The UE further configured to estimate a signal-to-interference ratio (SIRE) of the DL transmission. Based on the SIRE, the UE is configured to select a Transmission Power Control (TPC) command sequence for a low power mode of operation of the UE in which a receiver is powered down. The UE is further configured to activate the low power mode and transmit the selected TPC command sequence to the base station to adjust a DL transmission power during the low power mode.

In one aspect, after early decode termination and receiver shut down, the UE use optimal TPC for blind power control in the absence of SIR estimation in DL for the slots over which we power down the receiver. The conditions for optimality may include but not restricted to minimizing DL transmit power subject to constraints. In one aspect, the constraints could include a restraint on the maximum number of successive DOWN/UP commands that can be sent, or a limit on the minimum level to which the DL slot power is brought down compared to the period when DL receiver is actively receiving. Also, the constraint could include choosing that sequence of amongst all TPC sequences of a certain length, that have the least variance in DL transmitted power, while meeting the same DL transmit power savings requirements.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

The disclosed aspects will hereinafter be described in conjunction with the appended drawings, provided to illustrate and not to limit the disclosed aspects, wherein like designations denote like elements, and in which.

DETAILED DESCRIPTION

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Figure 1:
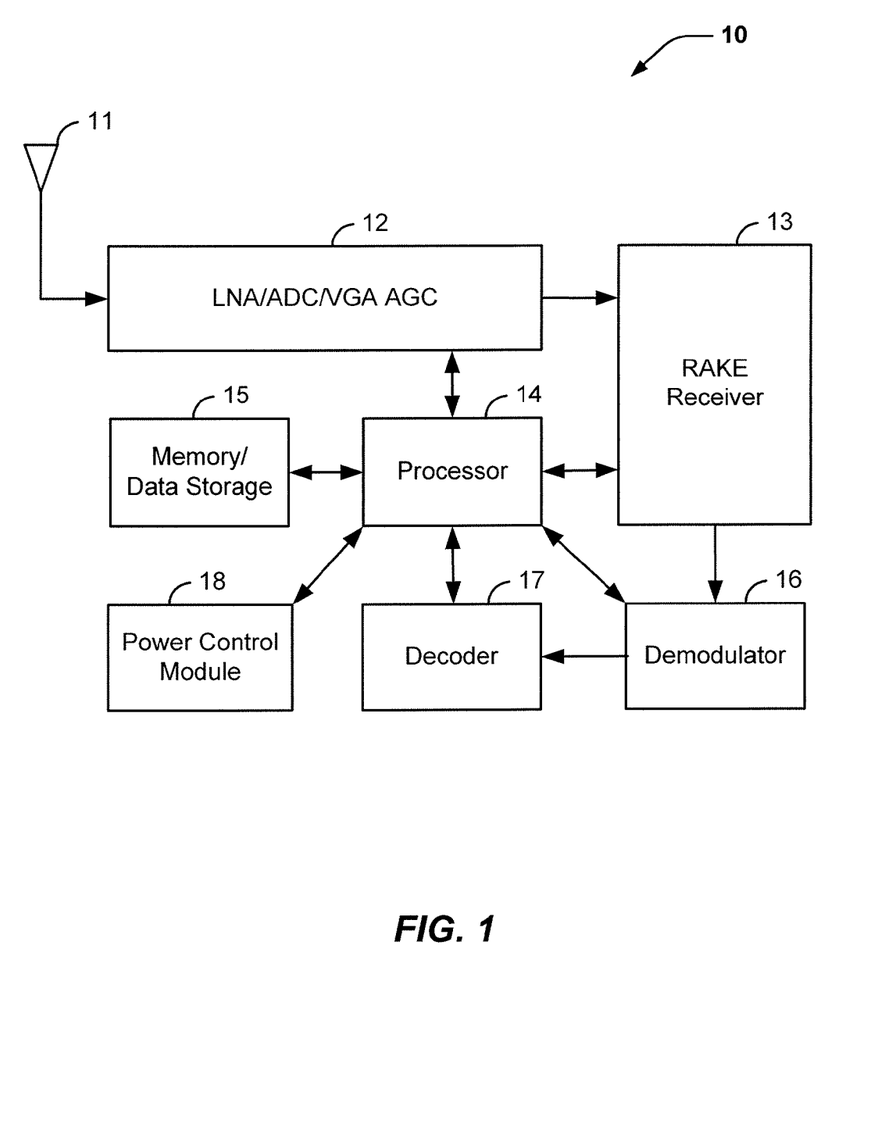
FIG. 1 is a block diagram that illustrates one example implementation of a UE comprising a power control module.

FIG. 1 illustrates an example architecture of a UE. UE 10 includes a RF antenna 11 that receives RF signals, such as WCDMA voice or data packets and pilot signals, from a base station and transforms them into electromagnetic signals. The signals are transmitted to amplifier circuit 12, which may include a low noise amplifier (LNA), analog-to-digital converter (ADC), variable gain amplifier (VGA) and automatic gain control (AGC) circuit, which calibrates operating range of the LNA, ADC and VGA. The amplified and digitized signals are then passed to a Rake receiver 13, which is designed to mitigate the effects of multipath fading. Rake receiver 13 may include a path search for identifying different propagation paths of the signal, a channel estimator that estimate channel conditions, such as time delay, amplitude and phase for each path component, and a path combiner that combines strongest multipath components of the received signal into one signal. The resulting signal is then demodulated by a demodulator 16, such as a QPSK demodulator. The demodulated signal is passed to decoder 17, such as Viterbi decoder, which performs decoding of the convolutionally encoded data used in the WCDMA transmissions. The UE 10 also includes a processor 14, such as a microprocessor or microcontroller, which executes programs for controlling operation of the components of the UE 10, and memory 15 that stores runtime data and programs that are executed by the processor 14.

As mentioned above, some WCDMA systems provide early voice frame termination functionality by which UE 10 may attempt to perform early decoding of data on voice transport channels, so that the receiver circuitry of the UE 10 may be transitioned into a low-power mode to preserve UE battery power if the early decode of the received frames is successful. More specifically, a WCDMA base station (BS), e.g., Node B, typically divides voice data into blocks, which are encoded and transmitted to the UE 10 on a Downlink (DL) Dedicated Traffic Channel (DTCH) as one or more frames. Each DTCH frame has duration of one transmission time interval (TTI), which may span one, two, four, or eight 10 ms frames. As used herein, the term "early decoding" refers to, the UE 10 attempting to decode the received DTCH frames as early as at 8 ms into the TTI (or possibly earlier or later in some aspects). If the DTCH frame is successfully early decoded (e.g., before all DTCH frames are received), the UE may disregard the rest of the DTCH frames and go into low-power mode to preserve battery power of the UE 10.

In one aspect, the UE 10 may include a power control module 18 that performs a DL power control. In various aspects, the power control module 18 may be implemented as a separate hardware component or can be a software component implemented by, for example, processor 14 of the UE 10. For example, while the UE 10 operates in a high-power mode, the power control module 18 may monitor DL signal strength and may request the base station to increase or decrease its DL transmit power. For example, module 18 may monitor signal strength of the common and dedicated pilots of DL DTCH and send Uplink Transmit Power Control (UL TPC) commands to the base station every slot, instructing the base station to increase or decrease power at which voice signals are transmitted on the DL DTCH. Module 18 may generate UL TPC command by comparing the signal-to-interference ratio estimate (SIRE) of the DTCH and the target SIR (SIRT) needed to meet the block error rate (BLER) requirements set forth by the network. Module 18 may generate an UL TPC UP command if SIRE<SIRT to request more power on the DL channel from the BS and an UL TPC DOWN command if SIRE>SIRT to request less power on the DL channel from the BS.

When the UE 10 switches to the low-power mode upon successful early decoding of a DTCH frame, UE no longer decodes the dedicated pilot or has an updated noise estimate, and therefore may not be able to compute a SIRE for the UL TPC command determination. In addition, since the voice frame has been successfully decoded prior to the TTI boundary, the UE 10 does not need reliable DTCH channel bits for the remainder of the TTI and can hence request less power from the network during this time. The only constraints, then, entering or exiting this period of time are to maintain the required SIR before and after the low power mode.

To that end, in one example aspect, the power control module 18 may be further configured control the amount of requested power from the base station while the UE 10 is in a low power mode following early frame decoding. The power control module 18 follows the following constraints in determining an amount of requested power from the base station: 1) Upon exiting the low power mode, the SIR levels received at the UE be approximately at the level of SIRT, or at the level prior to entering the low power mode. 2) That there is a lower bound on the power requested during this period, as compared to the levels received prior to entering the low power mode. 3) That excess consecutive UP commands are avoided in the case that the base station/network is not listening to UL TPC down commands from the UE. Constraint (1) may be imposed to ensure smooth functioning of the outer loop power control mechanism and to maintain target BLER as required by the 3GPP standards. Constraint (2) may be imposed to protect the fidelity of the decoded TPC bits during the UE low power mode and/or to protect the downside to the required SIR levels in the event of drastic channel changes during the Discontinuous Reception (DRX) period and also to account for concerns related to base station handling of DTCH Eclor floor (limits). Constraint (3) may be imposed to avoid excess UP power requests in the event that network is giving significantly more power to UE than UE is requesting. Other constraints may also be imposed.

Figure 2:
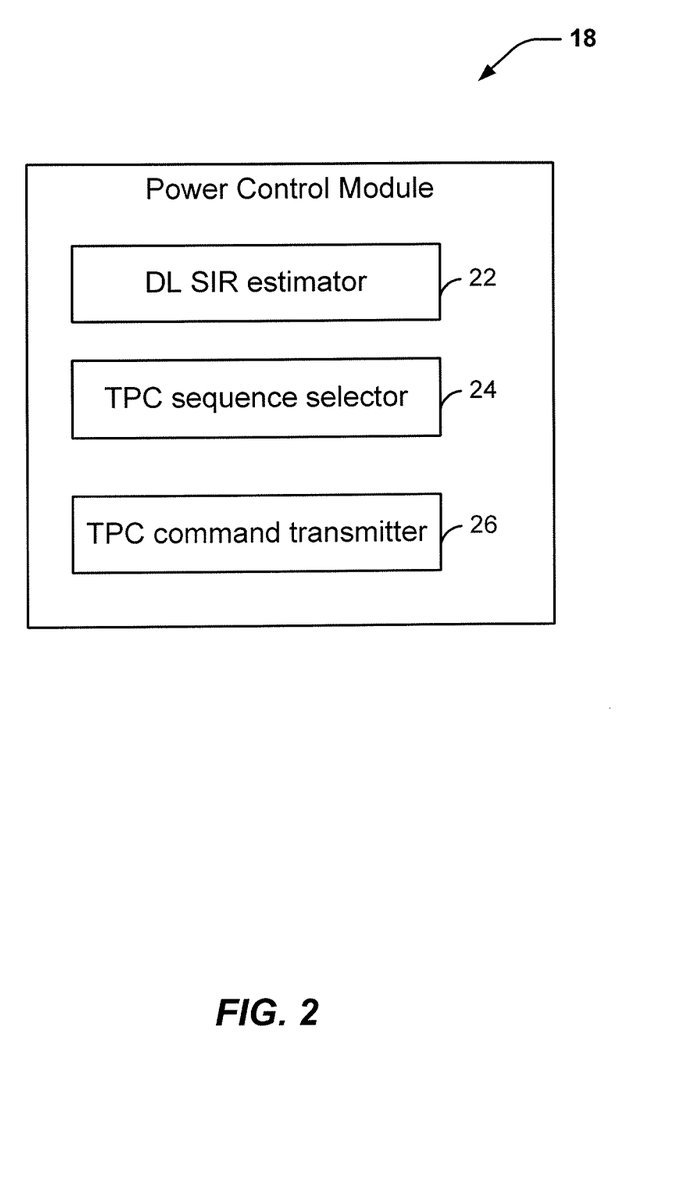
FIG. 2 is a block diagram that illustrates example of an aspect of the power control module of FIG. 1.

FIG. 2 shows an example configuration of the power control module 18 which includes three components: a SIR estimator 22, UL TPC sequence selector 24, and UL TPC command transmitter. The SIR estimator 22 is configured to measure common and dedicated pilots of DTCH and estimate DL SIR based on the pilot measurements. Once the DL SIRE has been estimated, the sequence selector 24 selects an appropriate UL TPC command sequence for the low power mode. Generally, two types of TPC command sequences may be selected to satisfy the above listed constrains: 1) UL TPC command sequences that minimize base station DTCH EcIor during the low power period. These UL TPC sequences may be chosen based on the length of the low power mode, as well as the excess SIRE above the SIRT upon entering the low power mode. 2) In the event that network has consistently been sending more power than UE needs (effectively ignoring the UL TPC bits from the UE), an all down UL TPC command sequence may be selected and sent until a noticeable change (i.e., a change above certain threshold, which is specified by the network) is seen in the DL signal power during the low power mode, which would indicate network has started listening to the UE's UL TPC commands, and then going into the sequences of the first type.

Following are several examples of the sequences of the first type: 1) If at the end of the high power mode, UE determines that there is no excess power from base station, then during the 14 slot low power mode cycle, the UE may transmit 7 DOWN UL TPC commands (over all power decrease of −7 dB) followed by 7 UP UL TPC commands (overall power increase of +7 dB), thereby bring the downlink power in the new high power cycle to the same level as the downlink power in the previous high power cycle. 2) If the UE does not want to decrease downlink power all the way down, the UE may send 4 DOWN UL TPC commands, toggle several UP and DOWN commands, followed by 4 UP UL TPC commands. 3) If UE determines that there is too much power at the end of the high power cycle, the UE may adjust the downlink transmit power, so that the new high-power cycle starts at a lower power level. This can be achieved by transmitting, for example, 9 DOWN UL TPC commands, followed by 5 UP UL TPC commands, which results in 4 dB decrease in power at the new power cycle.

Table below provides several examples of TPC command sequences for different lengths of low power mode, which can be selected by the sequence selector 24:

| Low Power Mode length in Slots | Sequence look up |
| --- | --- |
| 1 | 1 |
| 2 | 01 |
| 3 | 011 |
| 4 | 0011 |
| 5 | 00111 |
| 6 | 001011 |
| 7 | 0001111 |
| 8 | 00101011 |
| 9 | 000110111 |
| 10 | 0001001111 |
| 11 | 00000111111 |
| 12 | 000101001111 |
| 13 | 0001001011111 |
| 14 | 00010101010111 |
| 15 | 000100110011111 |

In one aspect, the following algorithm may be used to choose an appropriate UL TPC command sequences during the low power mode: Determine if excess SIRE for 5 consecutive frames (50 ms)>SIRT+3 dB. If NO, compute average excess SIRE for 15 slots (10 ms) prior to the low power mode gap. If excess SIRE>0, change predetermined UL TPC command sequence to have a negative bias close to the excess SIRE. If YES, do not use a predefined sequence; instead, start transmitting all TPC down commands. Monitor TPC power and see if decrease in TPC power is seen. If TPC power DOES NOT decrease by >3 dB, continue to transmit DOWN commands until decrease of 3 dB in TPC power is seen. If TPC power DOES decrease by 3 dB or more, start sending UL TPC pattern indexed by current slot and excess SIR−3 dB.

The above-described UL TPC sequences and algorithms may have one or more of the following advantages: 1) Minimizing the UE requested power from the network, thereby improving network capacity; 2) Offering predetermined patterns which have a net decrease in requested power from the network under the condition where UE is receiving excess power upon entrance to the low power mode; 3) Allowing for a mode of all down requests given conditions where network is not listening to UE TPC commands; and 4) Minimizing the impact to DL channel demodulation while achieving all of above benefits; and various other advantages.

Figure 3:
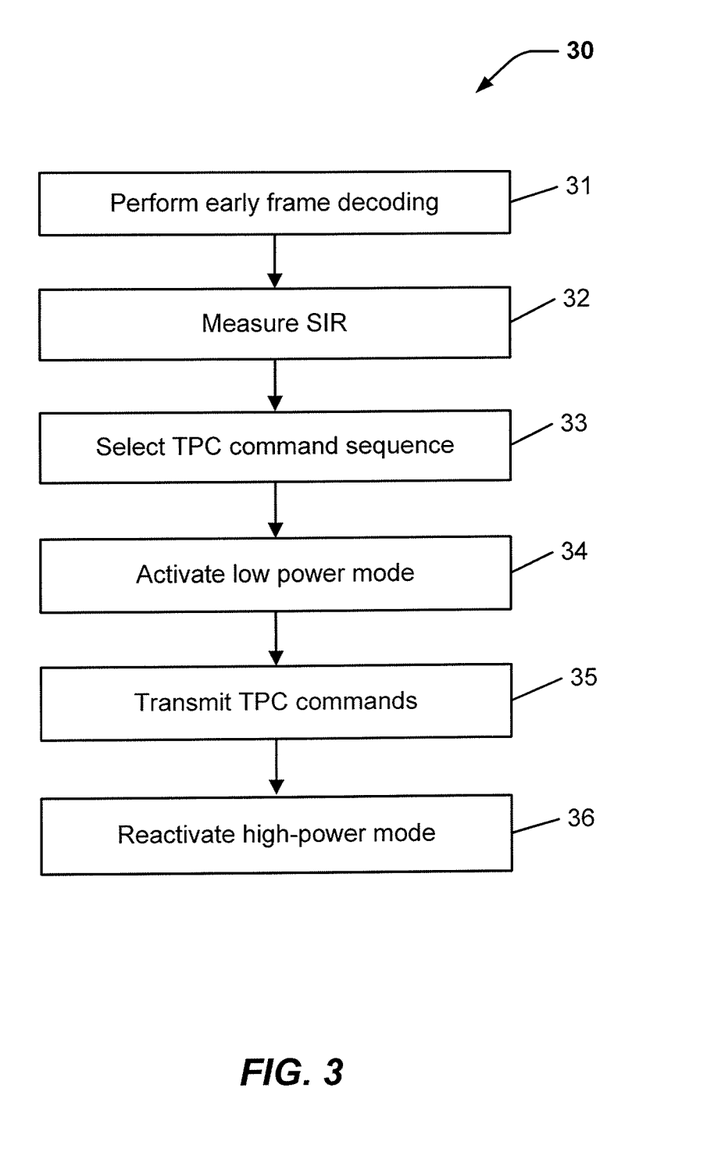
FIG. 3 is a flowchart that illustrates example of an aspect of a method for power control.

FIG. 3 is an example method of the uplink transmit power control (UL TPC) command determination. For example, in one aspect, methodology 30 may be executed by UE and/or components thereof, such as UE 10 (FIG. 1), one or more receiver components, and power control module 18 (FIG. 1). At step 31, the method 30 includes operating a UE in the high power mode, and performing early decoding of data or voice DTCH frames. For example, referring to FIGS. 1 and 2, a UE may execute modules 12, 13, 16 and 17 to receive signals from a base station and decode the data or voice frames within the signal. At step 32, the method 30 estimates SIR and compares it to the target SIR set by the network. For example, referring to FIGS. 1 and 2, power control module 18 may execute DL SIR estimator 22 to generate a SIR estimate based on processing received signals with a SIR estimation algorithm, and compare the SIR estimate to a stored target SIR. At step 33, the method 30 selects, based on the results of the comparison, a suitable TPC command sequence, which may include a predefined sequence or an all DOWN command sequence. For example, referring to FIGS. 1 and 2, power control module 18 may execute TPC sequence selector 24 to select an appropriate UL TPC command sequence. At step 34, once the decoding deemed successful, the method 30 activates a lower power mode. For example, referring to FIGS. 1 and 2, power control module 18 may activate low power mode on UE 10. At step 35, the method 30 transmits the selected TPC command sequence to the base station. For example, referring to FIGS. 1 and 2, power control module 18 may execute TPC command transmitter 26 to transmit selected UL TPC command sequence to the base station. At step 36, the method 30 may reactivate the high power mode again and begin receiving voice and data frames on the DL DTCH. For example, referring to FIGS. 1 and 2, power control module 18 may reactivate high power mode.

Figure 4:
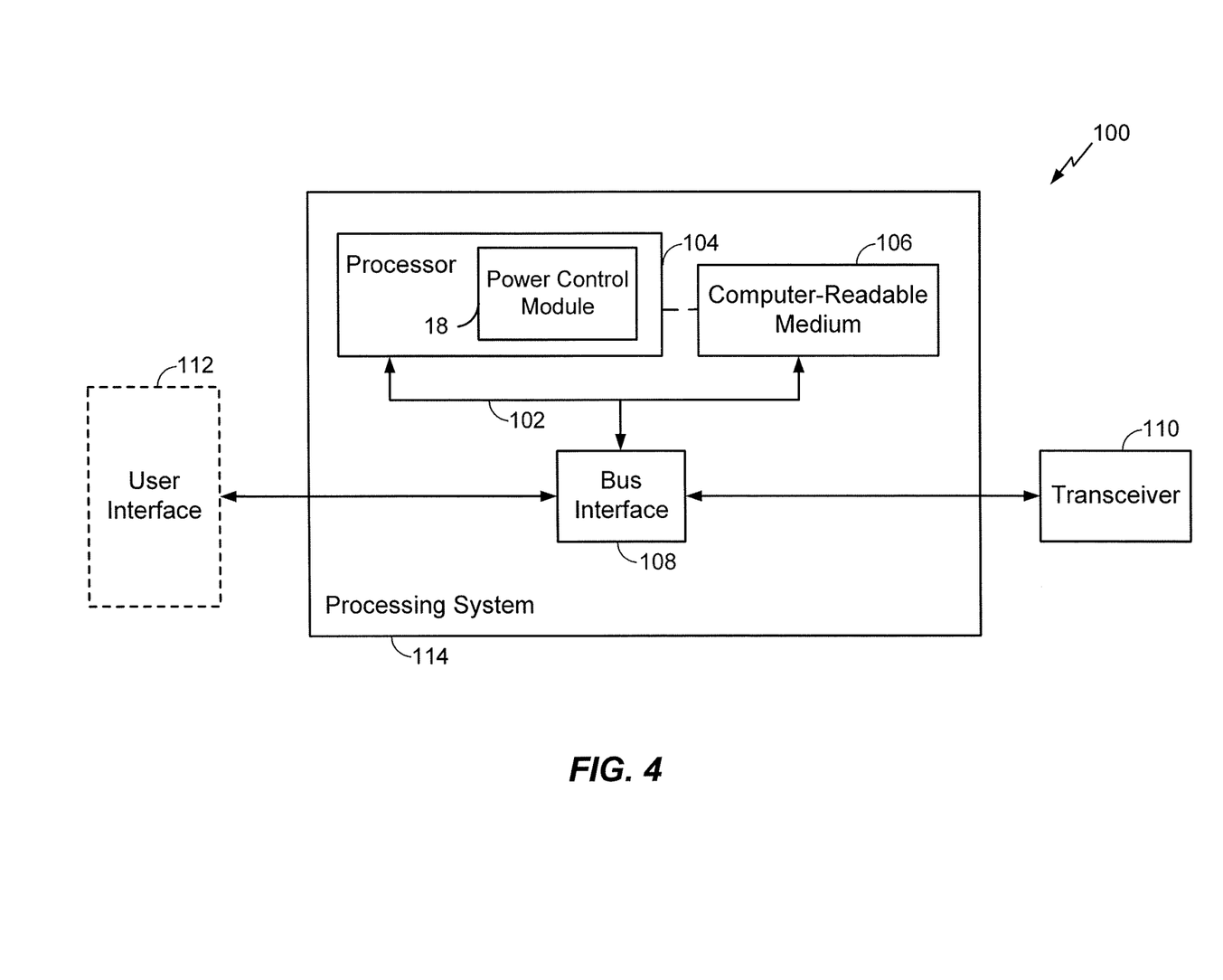
FIG. 4 is a block diagram illustrating an example of a hardware implementation for an apparatus employing a processing system configured to perform the transmit power control command generation described herein.

FIG. 4 is a block diagram illustrating an example of a hardware implementation for an apparatus 100, such as a UE 10 (FIG. 1), employing a processing system 114 in which power control module 18 is implemented by a processor 104, such as processor 14 (FIG. 1). In this example, the processing system 114 may be implemented with a bus architecture, represented generally by the bus 102. The bus 102 may include any number of interconnecting buses and bridges depending on the specific application of the processing system 114 and the overall design constraints. The bus 102 links together various circuits including one or more processors, represented generally by the processor 104, and computer-readable media, represented generally by the computer-readable medium 106. In an aspect, for example, the present apparatus and methods, including power control module 18, may be implemented via processor 104, CRM 106, or a combination thereof. The bus 102 may also link various other circuits such as timing sources, peripherals, voltage regulators, and power management circuits, which are well known in the art, and therefore, will not be described any further. A bus interface 108 provides an interface between the bus 102 and a transceiver 110. The transceiver 110 provides a means for communicating with various other apparatus over a transmission medium. Depending upon the nature of the apparatus, a user interface 112 (e.g., keypad, display, speaker, microphone, joystick) may also be provided.

The processor 104 is responsible for managing the bus 102 and general processing, including the execution of software stored on the computer-readable medium 106. The software, when executed by the processor 104, causes the processing system 114 to perform the various functions described infra for any particular apparatus. The computer-readable medium 106 may also be used for storing data that is manipulated by the processor 104 when executing software.

The various concepts presented throughout this disclosure may be implemented across a broad variety of telecommunication systems, network architectures, and communication standards. By way of example and without limitation, the aspects of the present disclosure may be implemented by the UE illustrated in FIG. 5, which is presented with reference to a UMTS system 200 employing a W-CDMA air interface. A UMTS network includes three interacting domains: a Core Network (CN) 204, a UMTS Terrestrial Radio Access Network (UTRAN) 202, and User Equipment (UE) 210. In this example, the UTRAN 202 provides various wireless services including telephony, video, data, messaging, broadcasts, and/or other services. The UTRAN 202 may include a plurality of Radio Network Subsystems (RNSs) such as an RNS 207, each controlled by a respective Radio Network Controller (RNC) such as an RNC 206. Here, the UTRAN 202 may include any number of RNCs 206 and RNSs 207 in addition to the RNCs 206 and RNSs 207 illustrated herein. The RNC 206 is an apparatus responsible for, among other things, assigning, reconfiguring and releasing radio resources within the RNS 207. The RNC 206 may be interconnected to other RNCs (not shown) in the UTRAN 202 through various types of interfaces such as a direct physical connection, a virtual network, or the like, using any suitable transport network.

Figure 5:
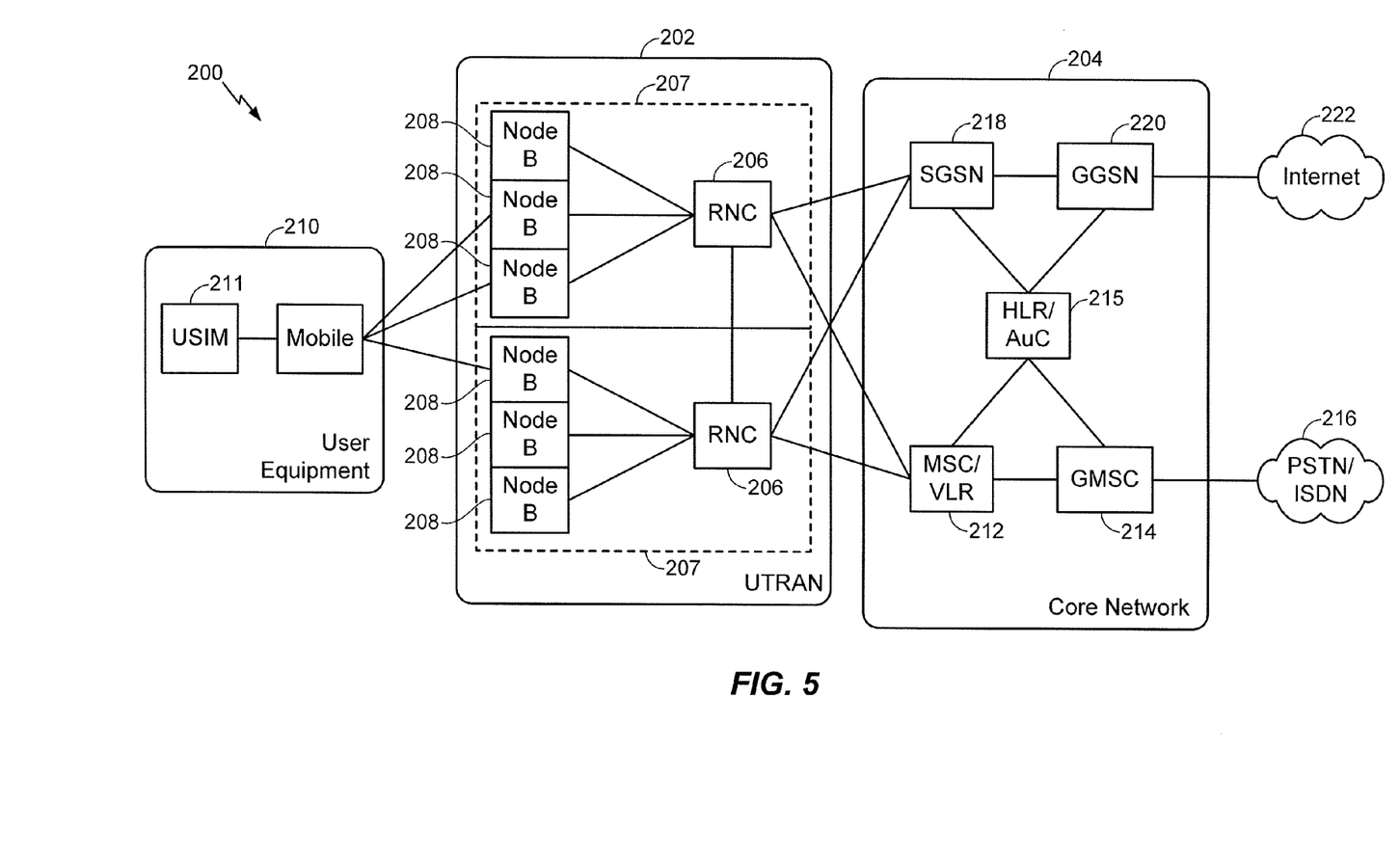
FIG. 5 is a block diagram conceptually illustrating an example of a telecommunications system including an aspect of the user equipment configured to perform the transmit power control command generation described herein.

Communication between a UE 210, which may be similar to UE 10 (FIG. 1) and including power control module 18 (FIGS. 1 and 2), and a Node B 208 may be considered as including a physical (PHY) layer and a medium access control (MAC) layer. Further, communication between a UE 210 and an RNC 206 by way of a respective Node B 208 may be considered as including a radio resource control (RRC) layer. In the instant specification, the PHY layer may be considered layer 1; the MAC layer may be considered layer 2; and the RRC layer may be considered layer 3. Information hereinbelow utilizes terminology introduced in the RRC Protocol Specification, 3GPP TS 25.331 v9.1.0, incorporated herein by reference.

The geographic region covered by the RNS 207 may be divided into a number of cells, with a radio transceiver apparatus serving each cell. A radio transceiver apparatus is commonly referred to as a Node B in UMTS applications, but may also be referred to by those skilled in the art as a base station (BS), a base transceiver station (BTS), a radio base station, a radio transceiver, a transceiver function, a basic service set (BSS), an extended service set (ESS), an access point (AP), or some other suitable terminology. For clarity, three Node Bs 208 are shown in each RNS 207; however, the RNSs 207 may include any number of wireless Node Bs. The Node Bs 208 provide wireless access points to a CN 204 for any number of mobile apparatuses. Examples of a mobile apparatus include a cellular phone, a smart phone, a session initiation protocol (SIP) phone, a laptop, a notebook, a netbook, a smartbook, a personal digital assistant (PDA), a satellite radio, a global positioning system (GPS) device, a multimedia device, a video device, a digital audio player (e.g., MP3 player), a camera, a game console, or any other similar functioning device. The mobile apparatus is commonly referred to as a UE in UMTS applications, but may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a terminal, a user agent, a mobile client, a client, or some other suitable terminology. In a UMTS system, the UE 210 may further include a universal subscriber identity module (USIM) 211, which contains a user's subscription information to a network. For illustrative purposes, one UE 210 is shown in communication with a number of the Node Bs 208. The DL, also called the forward link, refers to the communication link from a Node B 208 to a UE 210, and the UL, also called the reverse link, refers to the communication link from a UE 210 to a Node B 208.

The CN 204 interfaces with one or more access networks, such as the UTRAN 202. As shown, the CN 204 is a GSM core network. However, as those skilled in the art will recognize, the various concepts presented throughout this disclosure may be implemented in a RAN, or other suitable access network, to provide UEs with access to types of CNs other than GSM networks.

The CN 204 includes a circuit-switched (CS) domain and a packet-switched (PS) domain. Some of the circuit-switched elements are a Mobile services Switching Centre (MSC), a Visitor location register (VLR) and a Gateway MSC. Packet-switched elements include a Serving GPRS Support Node (SGSN) and a Gateway GPRS Support Node (GGSN). Some network elements, like EIR, HLR, VLR and AuC may be shared by both of the circuit-switched and packet-switched domains. In the illustrated example, the CN 204 supports circuit-switched services with a MSC 212 and a GMSC 214. In some applications, the GMSC 214 may be referred to as a media gateway (MGW). One or more RNCs, such as the RNC 206, may be connected to the MSC 212. The MSC 212 is an apparatus that controls call setup, call routing, and UE mobility functions. The MSC 212 also includes a VLR that contains subscriber-related information for the duration that a UE is in the coverage area of the MSC 212. The GMSC 214 provides a gateway through the MSC 212 for the UE to access a circuit-switched network 216. The GMSC 214 includes a home location register (HLR) 215 containing subscriber data, such as the data reflecting the details of the services to which a particular user has subscribed. The HLR is also associated with an authentication center (AuC) that contains subscriber-specific authentication data. When a call is received for a particular UE, the GMSC 214 queries the HLR 215 to determine the UE's location and forwards the call to the particular MSC serving that location.

The CN 204 also supports packet-data services with a serving GPRS support node (SGSN) 218 and a gateway GPRS support node (GGSN) 220. GPRS, which stands for General Packet Radio Service, is designed to provide packet-data services at speeds higher than those available with standard circuit-switched data services. The GGSN 220 provides a connection for the UTRAN 202 to a packet-based network 222. The packet-based network 222 may be the Internet, a private data network, or some other suitable packet-based network. The primary function of the GGSN 220 is to provide the UEs 210 with packet-based network connectivity. Data packets may be transferred between the GGSN 220 and the UEs 210 through the SGSN 218, which performs primarily the same functions in the packet-based domain as the MSC 212 performs in the circuit-switched domain.

An air interface for UMTS may utilize a spread spectrum Direct-Sequence Code Division Multiple Access (DS-CDMA) system. The spread spectrum DS-CDMA spreads user data through multiplication by a sequence of pseudorandom bits called chips. The "wideband" W-CDMA air interface for UMTS is based on such direct sequence spread spectrum technology and additionally calls for a frequency division duplexing (FDD). FDD uses a different carrier frequency for the UL and DL between a Node B 208 and a UE 210. Another air interface for UMTS that utilizes DS-CDMA, and uses time division duplexing (TDD), is the TD-SCDMA air interface. Those skilled in the art will recognize that although various examples described herein may refer to a W-CDMA air interface, the underlying principles may be equally applicable to a TD-SCDMA air interface.

An HSPA air interface includes a series of enhancements to the 3G/W-CDMA air interface, facilitating greater throughput and reduced latency. Among other modifications over prior releases, HSPA utilizes hybrid automatic repeat request (HARQ), shared channel transmission, and adaptive modulation and coding. The standards that define HSPA include HSDPA (high speed downlink packet access) and HSUPA (high speed uplink packet access, also referred to as enhanced uplink, or EUL).

HSDPA utilizes as its transport channel the high-speed downlink shared channel (HS-DSCH). The HS-DSCH is implemented by three physical channels: the high-speed physical downlink shared channel (HS-PDSCH), the high-speed shared control channel (HS-SCCH), and the high-speed dedicated physical control channel (HS-DPCCH).

Among these physical channels, the HS-DPCCH carries the HARQ ACK/NACK signaling on the uplink to indicate whether a corresponding packet transmission was decoded successfully. That is, with respect to the downlink, the UE 210 provides feedback to the node B 208 over the HS-DPCCH to indicate whether it correctly decoded a packet on the downlink.

HS-DPCCH further includes feedback signaling from the UE 210 to assist the node B 208 in taking the right decision in terms of modulation and coding scheme and precoding weight selection, this feedback signaling including the CQI and PCI.

"HSPA Evolved" or HSPA+ is an evolution of the HSPA standard that includes MIMO and 64-QAM, enabling increased throughput and higher performance. That is, in an aspect of the disclosure, the node B 208 and/or the UE 210 may have multiple antennas supporting MIMO technology. The use of MIMO technology enables the node B 208 to exploit the spatial domain to support spatial multiplexing, beamforming, and transmit diversity.

Multiple Input Multiple Output (MIMO) is a term generally used to refer to multi-antenna technology, that is, multiple transmit antennas (multiple inputs to the channel) and multiple receive antennas (multiple outputs from the channel). MIMO systems generally enhance data transmission performance, enabling diversity gains to reduce multipath fading and increase transmission quality, and spatial multiplexing gains to increase data throughput.

Spatial multiplexing may be used to transmit different streams of data simultaneously on the same frequency. The data steams may be transmitted to a single UE 210 to increase the data rate or to multiple UEs 210 to increase the overall system capacity. This is achieved by spatially precoding each data stream and then transmitting each spatially precoded stream through a different transmit antenna on the downlink. The spatially precoded data streams arrive at the UE(s) 210 with different spatial signatures, which enables each of the UE(s) 210 to recover the one or more the data streams destined for that UE 210. On the uplink, each UE 210 may transmit one or more spatially precoded data streams, which enables the node B 208 to identify the source of each spatially precoded data stream.

Spatial multiplexing may be used when channel conditions are good. When channel conditions are less favorable, beamforming may be used to focus the transmission energy in one or more directions, or to improve transmission based on characteristics of the channel. This may be achieved by spatially precoding a data stream for transmission through multiple antennas. To achieve good coverage at the edges of the cell, a single stream beamforming transmission may be used in combination with transmit diversity.

Generally, for MIMO systems utilizing n transmit antennas, n transport blocks may be transmitted simultaneously over the same carrier utilizing the same channelization code. Note that the different transport blocks sent over the n transmit antennas may have the same or different modulation and coding schemes from one another.

On the other hand, Single Input Multiple Output (SIMO) generally refers to a system utilizing a single transmit antenna (a single input to the channel) and multiple receive antennas (multiple outputs from the channel). Thus, in a SIMO system, a single transport block is sent over the respective carrier.

Figure 6:
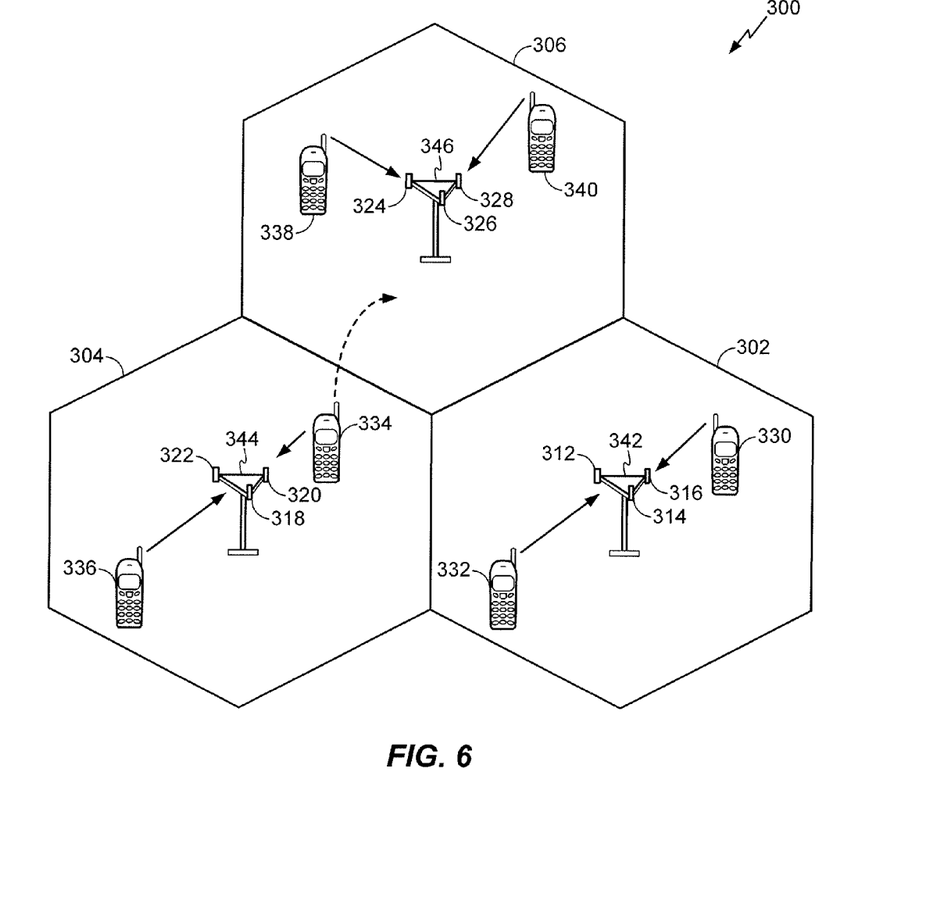
FIG. 6 is a conceptual diagram illustrating an example of an access network including a user equipment configured to perform the transmit power control command generation described herein.

Referring to FIG. 6, an access network 300 in a UTRAN architecture is illustrated, including one or more UEs, which may be similar to UE 10 (FIG. 1), and configured with the present apparatus or methods of FIGS. 2 and 3. The multiple access wireless communication system includes multiple cellular regions (cells), including cells 302, 304, and 306, each of which may include one or more sectors. The multiple sectors can be formed by groups of antennas with each antenna responsible for communication with UEs in a portion of the cell. For example, in cell 302, antenna groups 312, 314, and 316 may each correspond to a different sector. In cell 304, antenna groups 318, 320, and 322 each correspond to a different sector. In cell 306, antenna groups 324, 326, and 328 each correspond to a different sector. The cells 302, 304 and 306 may include several wireless communication devices, e.g., User Equipment or UEs, which may be in communication with one or more sectors of each cell 302, 304 or 306. For example, UEs 330 and 332 may be in communication with Node B 342, UEs 334 and 336 may be in communication with Node B 344, and UEs 338 and 340 can be in communication with Node B 346. Here, each Node B 342, 344, 346 is configured to provide an access point to a CN 204 (see FIG. 4) for all the UEs 330, 332, 334, 336, 338, 340 in the respective cells 302, 304, and 306. Further, one or more of UEs 330, 332, 334, 336, 338, 340 may be the same as or similar to UE 10 (FIG. 1), including power control module 18 (FIGS. 1 and 2).

As the UE 334 moves from the illustrated location in cell 304 into cell 306, a serving cell change (SCC) or handover may occur in which communication with the UE 334 transitions from the cell 304, which may be referred to as the source cell, to cell 306, which may be referred to as the target cell. Management of the handover procedure may take place at the UE 334, at the Node Bs corresponding to the respective cells, at a radio network controller 206 (see FIG. 4), or at another suitable node in the wireless network. For example, during a call with the source cell 304, or at any other time, the UE 334 may monitor various parameters of the source cell 304 as well as various parameters of neighboring cells such as cells 306 and 302. Further, depending on the quality of these parameters, the UE 334 may maintain communication with one or more of the neighboring cells. During this time, the UE 334 may maintain an Active Set, that is, a list of cells that the UE 334 is simultaneously connected to (i.e., the UTRA cells that are currently assigning a downlink dedicated physical channel DTCH or fractional downlink dedicated physical channel F-DTCH to the UE 334 may constitute the Active Set).

The modulation and multiple access scheme employed by the access network 300 may vary depending on the particular telecommunications standard being deployed. By way of example, the standard may include Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. The standard may alternately be Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), Ultra Mobile Broadband (UMB), IEEE 802.11 (Wi-Fi), IEEE 802.16 (WiMAX), IEEE 802.20, and Flash-OFDM employing OFDMA. UTRA, E-UTRA, UMTS, LTE, LTE Advanced, and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

Figure 7:
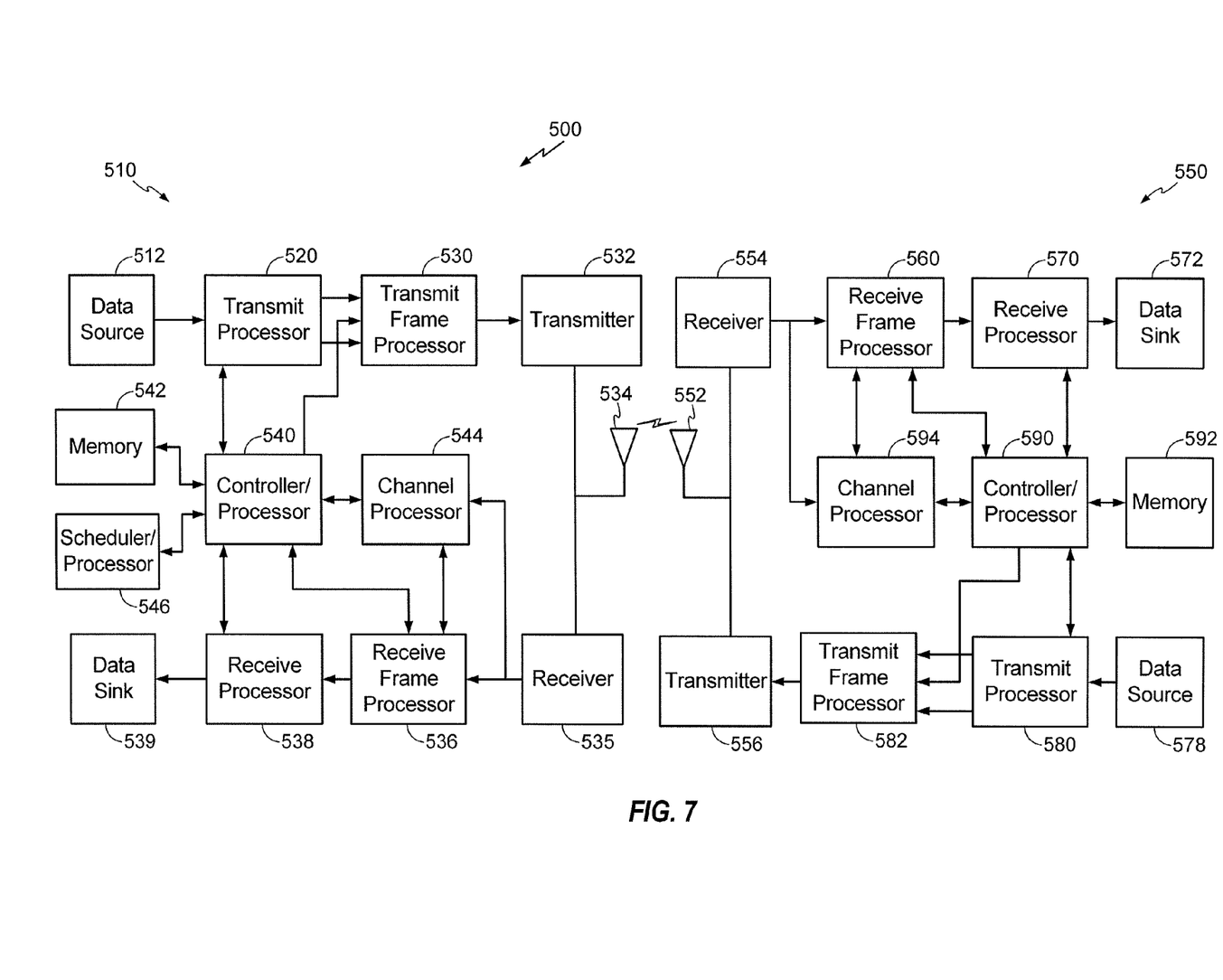
FIG. 7 is a block diagram conceptually illustrating an example of a Node B in communication with a UE in a telecommunications system, where the UE is configured to perform the transmit power control command generation described herein.

FIG. 7 is a block diagram of a Node B 510 in communication with a UE 550, where the Node B 510 may be the Node B 208 in FIG. 4, and the UE 550 may be the UE 10 in FIG. 1, executing power control module 18 (FIGS. 1 and 2). In the downlink communication, a transmit processor 520 may receive data from a data source 512 and control signals from a controller/processor 540. The transmit processor 520 provides various signal processing functions for the data and control signals, as well as reference signals (e.g., pilot signals). For example, the transmit processor 520 may provide cyclic redundancy check (CRC) codes for error detection, coding and interleaving to facilitate forward error correction (FEC), mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM), and the like), spreading with orthogonal variable spreading factors (OVSF), and multiplying with scrambling codes to produce a series of symbols. Channel estimates from a channel processor 544 may be used by a controller/processor 540 to determine the coding, modulation, spreading, and/or scrambling schemes for the transmit processor 520. These channel estimates may be derived from a reference signal transmitted by the UE 550 or from feedback from the UE 550. The symbols generated by the transmit processor 520 are provided to a transmit frame processor 530 to create a frame structure. The transmit frame processor 530 creates this frame structure by multiplexing the symbols with information from the controller/processor 540, resulting in a series of frames. The frames are then provided to a transmitter 532, which provides various signal conditioning functions including amplifying, filtering, and modulating the frames onto a carrier for downlink transmission over the wireless medium through antenna 534. The antenna 534 may include one or more antennas, for example, including beam steering bidirectional adaptive antenna arrays or other similar beam technologies.

At the UE 550, a receiver 554 receives the downlink transmission through an antenna 552 and processes the transmission to recover the information modulated onto the carrier. The information recovered by the receiver 554 is provided to a receive frame processor 560, which parses each frame, and provides information from the frames to a channel processor 594 and the data, control, and reference signals to a receive processor 570. The receive processor 570 then performs the inverse of the processing performed by the transmit processor 520 in the Node B 510. More specifically, the receive processor 570 descrambles and despreads the symbols, and then determines the most likely signal constellation points transmitted by the Node B 510 based on the modulation scheme. These soft decisions may be based on channel estimates computed by the channel processor 594. The soft decisions are then decoded and deinterleaved to recover the data, control, and reference signals. The CRC codes are then checked to determine whether the frames were successfully decoded. The data carried by the successfully decoded frames will then be provided to a data sink 572, which represents applications running in the UE 550 and/or various user interfaces (e.g., display). Control signals carried by successfully decoded frames will be provided to a controller/processor 590. When frames are unsuccessfully decoded by the receiver processor 570, the controller/processor 590 may also use an acknowledgement (ACK) and/or negative acknowledgement (NACK) protocol to support retransmission requests for those frames.

In the uplink, data from a data source 578 and control signals from the controller/processor 590 are provided to a transmit processor 580. The data source 578 may represent applications running in the UE 550 and various user interfaces (e.g., keyboard). Similar to the functionality described in connection with the downlink transmission by the Node B 510, the transmit processor 580 provides various signal processing functions including CRC codes, coding and interleaving to facilitate FEC, mapping to signal constellations, spreading with OVSFs, and scrambling to produce a series of symbols. Channel estimates, derived by the channel processor 594 from a reference signal transmitted by the Node B 510 or from feedback contained in the midamble transmitted by the Node B 510, may be used to select the appropriate coding, modulation, spreading, and/or scrambling schemes. The symbols produced by the transmit processor 580 will be provided to a transmit frame processor 582 to create a frame structure. The transmit frame processor 582 creates this frame structure by multiplexing the symbols with information from the controller/processor 590, resulting in a series of frames. The frames are then provided to a transmitter 556, which provides various signal conditioning functions including amplification, filtering, and modulating the frames onto a carrier for uplink transmission over the wireless medium through the antenna 552.

The uplink transmission is processed at the Node B 510 in a manner similar to that described in connection with the receiver function at the UE 550. A receiver 535 receives the uplink transmission through the antenna 534 and processes the transmission to recover the information modulated onto the carrier. The information recovered by the receiver 535 is provided to a receive frame processor 536, which parses each frame, and provides information from the frames to the channel processor 544 and the data, control, and reference signals to a receive processor 538. The receive processor 538 performs the inverse of the processing performed by the transmit processor 580 in the UE 550. The data and control signals carried by the successfully decoded frames may then be provided to a data sink 539 and the controller/processor, respectively. If some of the frames were unsuccessfully decoded by the receive processor, the controller/processor 540 may also use an acknowledgement (ACK) and/or negative acknowledgement (NACK) protocol to support retransmission requests for those frames.

The controller/processors 540 and 590 may be used to direct the operation at the Node B 510 and the UE 550, respectively. For example, the controller/processors 540 and 590 may provide various functions including timing, peripheral interfaces, voltage regulation, power management, and other control functions. The computer readable media of memories 542 and 592 may store data and software for the Node B 510 and the UE 550, respectively. A scheduler/processor 546 at the Node B 510 may be used to allocate resources to the UEs and schedule downlink and/or uplink transmissions for the UEs.

Several aspects of a telecommunications system have been presented with reference to a W-CDMA system. As those skilled in the art will readily appreciate, various aspects described throughout this disclosure may be extended to other telecommunication systems, network architectures and communication standards.

By way of example, various aspects may be extended to other UMTS systems such as TD-SCDMA, High Speed Downlink Packet Access (HSDPA), High Speed Uplink Packet Access (HSUPA), High Speed Packet Access Plus (HSPA+) and TD-CDMA. Various aspects may also be extended to systems employing Long Term Evolution (LTE) (in FDD, TDD, or both modes), LTE-Advanced (LTE-A) (in FDD, TDD, or both modes), CDMA2000, Evolution-Data Optimized (EV-DO), Ultra Mobile Broadband (UMB), IEEE 802.11 (Wi-Fi), IEEE 802.16 (WiMAX), IEEE 802.20, Ultra-Wideband (UWB), Bluetooth, and/or other suitable systems. The actual telecommunication standard, network architecture, and/or communication standard employed will depend on the specific application and the overall design constraints imposed on the system.

In accordance with various aspects of the disclosure, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise. The software may reside on a computer-readable medium. The computer-readable medium may be a non-transitory computer-readable medium. A non-transitory computer-readable medium includes, by way of example, a magnetic storage device (e.g., hard disk, floppy disk, magnetic strip), an optical disk (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and any other suitable medium for storing software and/or instructions that may be accessed and read by a computer. The computer-readable medium may also include, by way of example, a carrier wave, a transmission line, and any other suitable medium for transmitting software and/or instructions that may be accessed and read by a computer. The computer-readable medium may be resident in the processing system, external to the processing system, or distributed across multiple entities including the processing system. The computer-readable medium may be embodied in a computer-program product. By way of example, a computer-program product may include a computer-readable medium in packaging materials. Those skilled in the art will recognize how best to implement the described functionality presented throughout this disclosure depending on the particular application and the overall design constraints imposed on the overall system.

It is to be understood that the specific order or hierarchy of steps in the methods disclosed is an illustration of exemplary processes. Based upon design preferences, it is understood that the specific order or hierarchy of steps in the methods may be rearranged. The accompanying method claims present elements of the various steps in a sample order, and are not meant to be limited to the specific order or hierarchy presented unless specifically recited therein.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language of the claims, wherein reference to an element in the singular is not intended to mean "one and only one" unless specifically so stated, but rather "one or more." Unless specifically stated otherwise, the term "some" refers to one or more. A phrase referring to "at least one of" a list of items refers to any combination of those items, including single members. As an example, "at least one of: a, b, or c" is intended to cover: a; b; c; a and b; a and c; b and c; and a, b and c. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed under the provisions of 35 U.S.C. §112, sixth paragraph, unless the element is expressly recited using the phrase "means for" or, in the case of a method claim, the element is recited using the phrase "step for."

What is claimed is:

1. A method for wireless communication, comprising:
early decoding, by a processor of a user equipment (UE), a downlink (DL) transmission from a base station on a Dedicated Traffic Channel (DTCH), wherein the early decoding the DL transmission includes attempting to decode a DTCH frame before receiving all remaining DTCH frames;
calculating a signal-to-interference ratio estimate (SIRE) of the DL transmission;
selecting, based on a comparison of the SIRE with a target SIR (SIRT), a Transmission Power Control (TPC) command sequence to be transmitted on an uplink during a low power mode of operation of the UE in which a receiver is powered down;
activating the low power mode in response to determining that the early decoding was successful, wherein the UE stops decoding a dedicated pilot signal when activating the low power mode;
transmitting, in the low power mode, the selected TPC command sequence to the base station to adjust a DL transmission power during the low power mode.

2. The method of claim 1, further comprising, upon terminating the low power mode, activating a high power mode in which the receiver is powered up.

3. The method of claim 2, further comprising, when the SIRE is greater than the SIRT, selecting the TPC command sequence that lowers the DL transmit power during the low power mode and upon activating of the high power mode.

4. The method of claim 3, wherein the TPC command sequence comprises a DOWN command, which indicates to the base station to decrease the DL transmit power, and the method further comprising continuing to transmit DOWN commands to the base station until the base station decreases the DL transmit power.

5. The method of claim 2, further comprising, when the SIRE is less than the SIRT, selecting the TPC command sequence that increases the DL transmit power during the low power mode and upon activating the high power mode.

6. The method of claim 1, wherein the UE uses a sequence selector for blind power control using optimal TPC command sequences that satisfy one or more constraints.

7. The method of claim 6, wherein the using optimal TPC command sequences includes minimizing DL transmit power.

8. The method of claim 6, wherein the one or more constraints include one or more of:
   restricting length of successive identical DOWN commands or UP commands;
   selecting TPC command sequences that have the least variance in DL transmit power which achieve one or more conditions of optimality.

9. An apparatus for wireless communication, comprising:
   a receiver configured to receive downlink (DL) transmissions from a base station;
   a transmitter configured to transmit uplink (UL) transmission to the base station; and
   a processor coupled to the receiver and the transmitter, the processor configured to:
   early decode a downlink (DL) transmission from the base station on a Dedicated Traffic Channel (DTCH), wherein the early decoding the DL transmission includes attempting to decode a DTCH frame before receiving all remaining DTCH frames;
   calculate a signal-to-interference ratio estimate (SIRE) of the DL transmission;
   select, based on a comparison of the SIRE with a target SIR (SIRT), a Transmission Power Control (TPC) command sequence to be transmitted on an uplink during a low power mode of operation of the apparatus in which the receiver is powered down;
   activating the low power mode in response to determining that the early decoding was successful, wherein the UE stops decoding a dedicated pilot signal when activating the low power mode;
   transmitting, in the low power mode, the selected TPC command sequence to the base station to adjust a DL transmission power during the low power mode.

10. The apparatus of claim 9, wherein the processor is further configured to, upon terminating the low power mode, activate a high power mode in which the receiver is powered up.

11. The apparatus of claim 10, wherein the processor is further configured to, when the SIRE is greater than the SIRT, select the TPC command sequence that lowers the DL transmit power during the low power mode and upon activation of the high power mode.

12. The apparatus of claim 11, wherein the TPC command sequence comprises a DOWN command, which indicates to the base station to decrease the DL transmit power, and wherein the processor is further configured to continue to transmit DOWN commands to the base station until the base station decreases the DL transmit power.

13. The apparatus of claim 10, wherein the processor is further configured to, when the SIRE is less than the SIRT, select the TPC command sequence that increases the DL transmit power during the low power mode and upon activation of the high power mode.

14. The apparatus of claim 9, wherein the processor includes a sequence selector for blind power control using optimal TPC command sequences that satisfy one or more constraints.

15. The apparatus of claim 14, wherein the using optimal TPC command sequences includes minimizing DL transmit power.

16. The apparatus of claim 14, wherein the one or more constraints include one or more of:
   restricting length of successive identical DOWN commands or UP commands;
   selecting TPC command sequences that have the least variance in DL transmit power which achieve one or more conditions of optimality.

17. An apparatus for wireless communication, comprising:
   receiver means for receiving downlink (DL) transmissions from a base station;
   means for early decoding a downlink (DL) transmission from the base station on a Dedicated Traffic Channel (DTCH), wherein the means for early decoding the DL transmission includes means for attempting to decode a DTCH frame before receiving all remaining DTCH frames;
   means for calculating a signal-to-interference ratio estimate (SIRE) of the DL transmission;
   means for selecting, based on a comparison of the SIRE with a target SIR (SIRT), a Transmission Power Control (TPC) command sequence for a low power mode of operation of the apparatus in which the receiver means is powered down;
   means for activating the low power mode in response to determining that the early decoding was successful, wherein the UE stops decoding a dedicated pilot signal when activating the low power mode;
   transmitting means for transmitting, in the low power mode, the selected TPC command sequence to the base station to adjust a DL transmission power during the low power mode.

18. The apparatus of claim 17, further comprising, means for, upon terminating the low power mode, activating a high power mode in which the receiver means is powered up.

19. The apparatus of claim 18, further comprising, means for, when the SIRE is greater than the SIRT, selecting the TPC command sequence that lowers the DL transmit power during the low power mode and upon activating of the high power mode.

20. The apparatus of claim 19, wherein the TPC command sequence comprises a DOWN command, which indicates to the base station to decrease the DL transmit power, and the apparatus further comprising means for continuing to transmit DOWN commands to the base station until the base station decreases the DL transmit power.

21. The apparatus of claim 18, further comprising means for, when the SIRE is less than the SIRT, selecting the TPC command sequence that increases the DL transmit power during the low power mode and upon activating the high power mode.

22. The apparatus of claim 17, further including a sequence selector means for blind power control using optimal TPC command sequences that satisfy one or more constraints.

23. The apparatus of claim 22, wherein the using optimal TPC command sequences includes minimizing DL transmit power.

24. The apparatus of claim 22, wherein the one or more constraints include one or more of:
   restricting length of successive identical DOWN commands or UP commands;

selecting TPC command sequences that have the least variance in DL transmit power which achieve one or more conditions of optimality.

25. A non-transitory computer-readable medium comprising code for:
   early decoding, by a processor of a user equipment (UE), a downlink (DL) transmission from a base station on a Dedicated Traffic Channel (DTCH), wherein the early decoding the DL transmission includes attempting to decode a DTCH frame before receiving all remaining DTCH frames;
   calculating a signal-to-interference ratio estimate (SIRE) of the DL transmission;
   selecting, based on a comparison of the SIRE with a target SIR (SIRT), a Transmission Power Control (TPC) command sequence to be transmitted on an uplink during a low power mode of operation of the UE in which a receiver is powered down;
   activating the low power mode in response to determining that the early decoding was successful, wherein the UE stops decoding a dedicated pilot signal when activating the low power mode;
   transmitting, in the low power mode, the selected TPC command sequence to the base station to adjust a DL transmission power during the low power mode.

26. The non-transitory computer-readable medium of claim 25, further comprising code for, upon terminating the low power mode, activating a high power mode in which the receiver is powered up.

27. The non-transitory computer-readable medium of claim 26, further comprising code for, when the SIRE is greater than the SIRT, selecting the TPC command sequence that lowers the DL transmit power during the low power mode and upon activating of the high power mode.

28. The non-transitory computer-readable medium of claim 27, wherein the TPC command sequence comprises a DOWN command, which indicates to the base station to decrease the DL transmit power, and the non-transitory computer-readable medium further comprising code for continuing to transmit DOWN commands to the base station until the base station decreases the DL transmit power.

29. The non-transitory computer-readable medium of claim 26, further comprising code for, when the SIRE is less than the SIRT, selecting the TPC command sequence that increases the DL transmit power during the low power mode and upon activating the high power mode.

30. The non-transitory computer-readable medium of claim 25, further comprising code for a sequence selector configured to perform blind power control using optimal TPC command sequences that satisfy one or more constraints.

31. The non-transitory computer-readable medium of claim 30, wherein the using optimal TPC command sequences includes minimizing DL transmit power.

32. The non-transitory computer-readable medium of claim 30, wherein the one or more constraints include one or more of:
   restricting length of successive identical DOWN commands or UP commands;
   selecting TPC command sequences that have the least variance in DL transmit power which achieve one or more conditions of optimality.

* * * * *